(12) United States Patent
Baksh et al.

(10) Patent No.: US 7,294,172 B2
(45) Date of Patent: Nov. 13, 2007

(54) HELIUM RECOVERY

(75) Inventors: Mohamed Safdar Allie Baksh, Amherst, NY (US); Scot Eric Jaynes, Lockport, NY (US); Bernard Thomas Neu, Lancaster, NY (US); James Smolarek, Boston, NY (US); Mark Thomas Emley, Boston, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/484,902

(22) PCT Filed: Jul. 31, 2002

(86) PCT No.: PCT/US02/24576

§ 371 (c)(1),
(2), (4) Date: Jan. 27, 2004

(87) PCT Pub. No.: WO03/011431

PCT Pub. Date: Feb. 13, 2003

(65) Prior Publication Data

US 2004/0237789 A1    Dec. 2, 2004

Related U.S. Application Data

(60) Provisional application No. 60/309,091, filed on Jul. 31, 2001.

(51) Int. Cl.
*B01D 53/04* (2006.01)
*B01D 53/22* (2006.01)

(52) U.S. Cl. .............. 95/53; 95/117; 95/130; 95/138; 95/139; 95/140; 95/143; 96/4; 96/132

(58) Field of Classification Search .......... 95/53, 95/117, 130, 138, 139, 143, 140, 900, 901; 96/4, 121, 131, 132, 134, 154
See application file for complete search history.

(56) References Cited

U.S. PATENT DOCUMENTS

| | | | | |
|---|---|---|---|---|
| 3,944,400 A | * | 3/1976 | Bird | 95/11 |
| 4,238,204 A | | 12/1980 | Perry | 55/16 |
| 4,477,265 A | * | 10/1984 | Kumar et al. | 95/26 |
| 4,675,030 A | | 6/1987 | Czarnecki et al. | 55/16 |
| 4,717,407 A | | 1/1988 | Choe et al. | 62/18 |
| 5,080,694 A | * | 1/1992 | Knoblauch et al. | 95/26 |
| 5,089,048 A | * | 2/1992 | Knoblauch et al. | 95/103 |
| 5,158,625 A | | 10/1992 | Lhote et al. | 148/625 |
| 5,377,491 A | | 1/1995 | Schulte | 62/63 |
| 5,390,533 A | | 2/1995 | Schulte et al. | 73/40 |
| 5,451,248 A | * | 9/1995 | Sadkowski et al. | 95/99 |
| 5,632,803 A | | 5/1997 | Stoner et al. | 95/53 |
| 6,129,780 A | * | 10/2000 | Millet et al. | 95/117 |
| 6,183,709 B1 | * | 2/2001 | Stephenson et al. | 423/213.2 |

FOREIGN PATENT DOCUMENTS

JP    01-266831 A  *  10/1989

* cited by examiner

*Primary Examiner*—Frank M. Lawrence
(74) *Attorney, Agent, or Firm*—Flora W. Feng

(57) ABSTRACT

A gas recovery system comprising a source of gas having a preselected concentration of a desired component (9), at least one application (1) that adds impurities to said gas, and at least one an adsorption system (6) that purifies said gas to produce a purified gas for re-use in application (1), wherein said at least one adsorption system includes at least one adsorbent bed (A) having at least three layers of adsorbents. A recovery process is also disclosed.

24 Claims, 9 Drawing Sheets

Helium Recovery Process Showing the Integration of the PSA and Membrane Units.

HELIUM RECOVERY

Cross Reference to Related Application

The present application is a 371 of PCT/US02/24576, filed Jul. 31, 2002, which application claims priority to U.S. provisional application Ser. No. 60/309,091, filed Jul. 31, 2001.

FIELD OF THE INVENTION

The invention relates to the recycle and purification of helium gas streams for industrial applications.

BACKGROUND OF THE INVENTION

Gases such as helium, argon, neon, krypton and xenon have the potential to be used in a wide range of manufacturing processes. An example of one such process is the production of semiconductor devices such as semiconductor integrated circuits, active matrix liquid crystal panels, solar cells panels and magnetic discs. During the manufacture of the semiconductor devices, systems for generating plasma in a noble gas atmosphere under reduced pressure are utilized for various treatments of the semiconductor devices with the plasma, for example, a sputtering system, a plasma CVD system and reactive ion etching system. In addition, noble gases are used in other applications such as metal atomization processes, cold spray forming, cooling, and shield gas applications.

Most of the aforementioned applications use large quantities of noble gas such as helium. The cost of using helium would be prohibitive without some form of recycle system for the used gas. In order to recycle the noble gas to the application, impurities such as water, nitrogen, oxygen, carbon dioxide, methane carbon monoxide, hydrogen and particulates from furnace off gas must be removed from the used gas.

Various purification systems have been proposed in the prior art. Such systems include helium recycle with membrane, thermal swing adsorption (TSA), pressure swing adsorption (PSA) and/or copper oxide technology. The choice of purification technology depends on the type of process, the off-gas impurities and inlet feed gas compositions. For example, if the only contaminant in the noble gas is oxygen, then a copper oxide getter could be used to take out oxygen. However, if only water is present, then a dryer operating in TSA mode may be used. If both water and oxygen are present, then a combination of copper oxide getter and dryer may be used for purifying the noble gas (e.g., helium).

Ohmi et al., in U.S. Pat. No. 6,217,633 B1 discloses a process and an apparatus for recovering a noble gas (defined as one or more of Xe, Ar, Kr Ne or mixtures thereof) contained in an exhaust gas from a noble gas employing unit. In particular, the invention of Ohmi et al., provides a process and apparatus for recovering a noble gas at high recovery and predetermined purity from a noble gas employing system such as plasma treating system. The noble gas employing system operates under reduced pressure. The recovery unit receives intermittent feed gas based on the inpurity concentrations in the used gas (exhaust gas) leaving the noble gas employing unit. The impurities include oxygen, nitrogen, water, carbon monoxide, carbon dioxide, carbon fluoride, hydrogen and various film-forming gases. If the impurity concentrations are beyond certain limits, then the used gas is exhausted as waste instead of being sent to the recovery unit. The choice of venting exhaust gas from the noble gas employing system as waste or sending to the recovery unit depends on the content of impurity components contained in the exhaust gas or on the running state of the noble gas employing system.

U.S. Pat. No. 5,390,533 describes a process for pressurizing a vessel for integrity testing using helium as the tracer gas. The invention also discloses the recovery and purification of helium for reuse. The process for purifying the gas stream comprises drying the gas stream using a membrane dryer that permeates water. The water depleted raffinate from the membrane dryer is sent to a membrane separator for further purification. Helium selectively permeates the membrane in the membrane separator to produce a helium enriched permeate stream. The helium-depleted raffinate stream is sent to a membrane stripper stage to obtain a purge stream to purge water from the membrane dryer.

Behling et al., in U.S. Pat. No. 6,179,900 B1 disclose processes for the separation/recovery of gases where the desired component to be separated from the mixture is present in low molar concentrations and/or low to moderate pressures. A combined membrane/PSA process is utilized for the separation/recovery of gaseous components which are present in the stream at low pressures and/or molar contents. The membrane unit is positioned at the upstream end of the PSA process.

U.S. Pat. No. 6,092,391 discloses helium recycling for optical fiber manufacturing in which consolidation process helium is recycled either directly for use in consolidation at high purity or recycled at lower purity for usage in draw or other processes requiring lower helium purity. In addition, integrated processes for recycling helium from two or more helium using processes in the optical manufacturing process are also disclosed.

U.S. Pat. No. 5,707,425 to D'Amico et al., describes a process that is directed to the recovery of helium gas from gas streams containing about 25% by volume or more of helium. Two PSA processes are used in a serial arrangement. Stoner et al. in U.S. Pat. No. 5,632,803 discloses a hybrid membrane/PSA process for producing a helium product stream at a purity in excess of 98.0% from feed stock containing anywhere from 0.5 to 5.0% helium. The membrane is placed upstream of two PSA processes, and all of the separation units are arranged in a serial configuration.

U.S. Pat. No. 5,377,491 describes a coolant recovery process for a fiber optic cooling tube. The process uses a vacuum pump/compressor to remove cooling gas from the cooling tube, remove particulate and contaminants and then return the coolant gas to the fiber optic cooling tube. Purification equipment such as PSA, dryer and membrane are mentioned for the removal of water and oxygen.

U.S. Pat. No. 5,158,625 discloses a process for heat treating articles by hardening them in a recirculating gas medium which is in contact with the treated articles. According to one of the embodiments, used helium is collected and sent to a membrane unit to produce purified helium at low pressure. The purified helium from the membrane unit is sent to a dryer prior to reuse. In another embodiment, the used/contaminated helium is mechanically filtered, then oxygen is removed via controlled addition of hydrogen for catalytic production of water, after which the gas is possibly cooled and dried for reuse. In another embodiment, hydrogen is used for regenerating a catalyst used for trapping oxygen. Also, in a further embodiment, PSA or TSA is used for removing oxygen and water vapor, after which the gas is cooled and dried.

Knoblauch et al., U.S. Pat. Nos. 5,089,048 and 5,080,694 disclose PSA processes, arranged in a serial configuration, for extracting helium from a relatively helium poor gas mixture, e.g., natural gas containing 2-10% helium. The first PSA process is used for helium enrichment and the second PSA process is used to achieve target helium purity of at least 99.9%.

Choe et al., in U.S. Pat. No. 4,717,407 discloses a helium recovery system by integrating permeable membrane separation with "non-membrane" separation techniques. The patent refers to PSA applications as one of the possible "non-membrane" separation operations. Czarnecki et al., U.S. Pat. No. 4,675,030, disclose a method of purifying helium gas contaminated with air, water vapor and traces of carbon dioxide. The contaminants constitute less than about 10% by volume. According to this invention, the process contaminated helium gas is compressed and cooled to condense the bulk of the water vapour then the dried gas is passed to a first membrane unit to produce high purity helium for reuse. The retentate from the first membrane unit is passed to a second membrane unit. The permeate of the second membrane unit is recycled back to the first membrane unit, whereas, the retentate of the second membrane unit is discarded as waste.

U.S. Pat. No. 4,238,204 outlines an improved selective adsorption process for the recovery of a light gas, such as hydrogen or helium, from a feed gas mixture by utilizing a membrane permeator unit selectively permeable to the light gas being collected. Specifically, this invention utilizes a hybrid PSA/membrane process to recover helium. The PSA process is placed upstream of the membrane unit, and the effluent of the PSA process during the adsorption is collected as product helium. The exhaust gas from the PSA process, obtained during the purging step, is sent to a membrane unit for additional further purification. The permeate from the membrane unit is recycle to the PSA feed. The non-permeated gas mixture comprised mainly of the impurities and a small proportion of the helium is recovered for other use or disposed of as waste.

The prior art processes suffer from low helium purity and per pass recovery when using a single stage PSA process alone to recover helium. In addition, in order to achieve enhanced helium purity and recovery, the prior art typically utilized a combination of PSA and membranes, or PSA and cryogenic systems, or serial arrangements of PSA processes using different number of beds and PSA cycles. Consequently, using the prior art, the capital and operating costs are too high to promote the use of recovery systems to conserve noble gas such as helium.

OBJECTS OF THE INVENTION

It is therfore an object of this invention to provide a highly efficient and low cost noble gas (e.g., helium) recovery system to purify helium from one or more feed sources (e.g., metal atomization furnaces, plasma-arc furnaces, natural gas, etc.)

It is another object of this invention to provide a helium recovery system that will remove contaminants such as $O_2$, $N_2$, $H_2O$, CO, $CO_2$, $H_2$, metals, and metal salts from spent helium exiting from various applications (e.g., atomization furnaces).

It is a further objective to provide a helium recovery process to recover and purify helium for use in semiconductor applications.

SUMMARY OF THE INVENTION

The present invention is a highly efficient and low cost noble gas (e.g., helium) recovery system for the recovery and conservation of noble gas (e.g.,helium) used in various applications. The recovery system may be used for noble gas recovery from any application using noble gas including but not limited to atomization furnaces, metal atomization, plasma CVD, sputtering system, reactive ion etching system,-and plasma-arc furnaces.

The recovery process uses a PSA process with adsorbents having the capability to remove contaminants such as $O_2$, $N_2$, $H_2O$, $CO_2$, and CO.

In one embodiment, the invention comprises a gas recovery system comprising a source of gas having a preselected concentration of a desired component (e.g.a noble gas), at least one application that uses said gas and adds impurities to said gas, and at least one adsorption system that purifies said gas to produce a purified gas for re-use in application, wherein said at least one adsorption system includes at least one adsorbent bed (A) having at least three layers of adsorbents.

In a more preferred embodiment, the desired component is helium, and said preselected concentration is 99.999 mole %.

In an alternative embodiment, a gas recovery process is also disclosed, the process comprising the steps of a) providing gas having a preselected concentration of a desired component to an application, b) adding impurities to said gas in said application to produce an impure gab having a lower concentration of said desired component;

c) passing said impure gas to an adsorption system that purifies said gas to produce a purified gas (preferably having said preselected concentration of said desired component) for re-use in said application, wherein said adsorption system includes at least one adsorbent bed (A) having at least three layers of adsorbents.

In a preferred embodiment, the waste gas produced from said adsorption system (which has a second concentration of said desired component which is lower than said preselected concentration), is recirculated through said adsorption system for purification to produce a purified recirculated gas having a concentration of the desired component that is preferably at least as high as said preselected concentration, which may then be provided to said application.

In another embodiment of the process, the adsorption system waste gas is directed to a membrane system (7) which produces a partially purified gas having a higher concentration of said desired component than said waste gas, and wherein said partially purified gas is combined with said impure gas which is then passed through said adsorption system for purification.

BRIEF DESCRIPTION OF THE DRAWING(S)

Other objects, features and advantages will occur to those skilled in the art from the following description of (a) preferred embodiment(s) and the accompanying drawing(s), in which.

DETAILED DESCRIPTION OF THE INVENTION

The invention provides a method for decreasing the impurities in a product gas from a PSA process for separating helium from impurities including $O_2$, $N_2$, $H_2O$, $CO_2$, $CH_4$, and CO.

Figure 1:
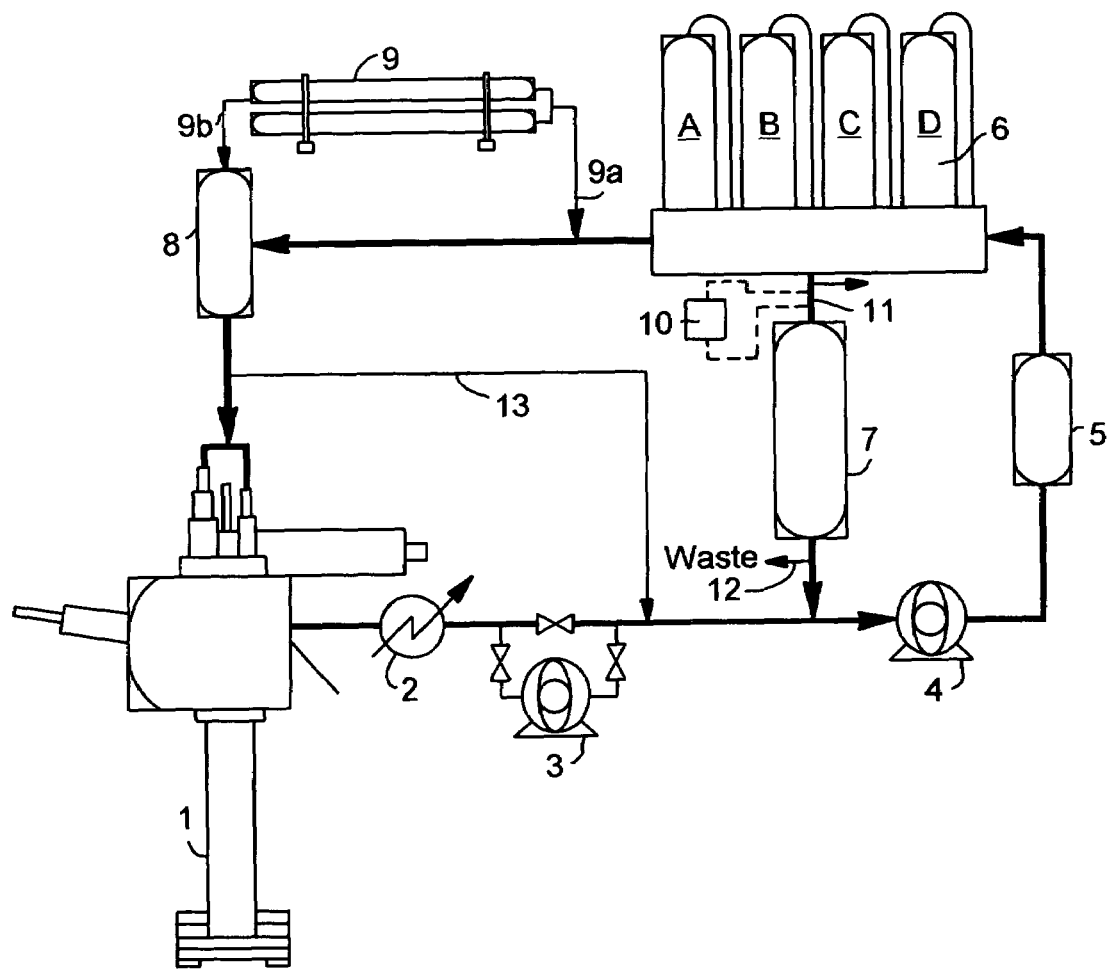
FIG. 1 is a process flow diagram of an embodiment of the invention utilizing a hydrogen removal unit, PSA system and membrane unit.
Figure 2:
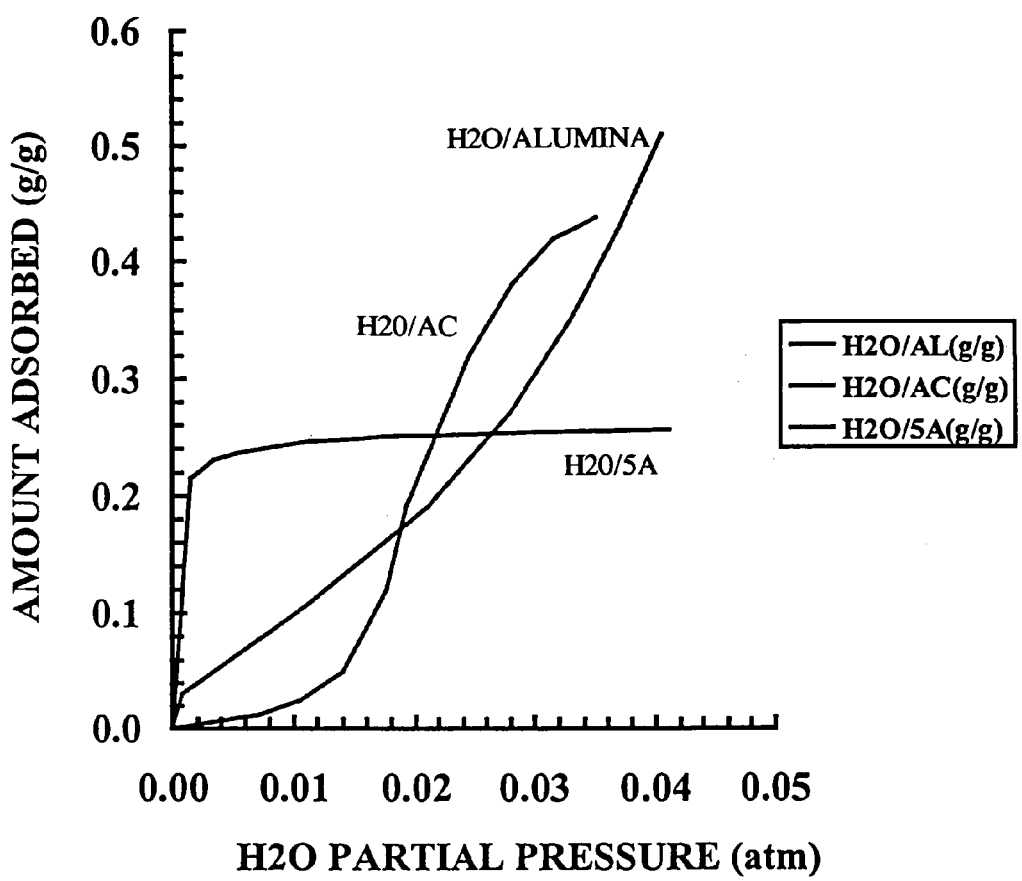
FIG. 2 shows adsorption isotherms of water on activated carbon (AC), 5A zeolite and alumina at 300K.
Figure 3:
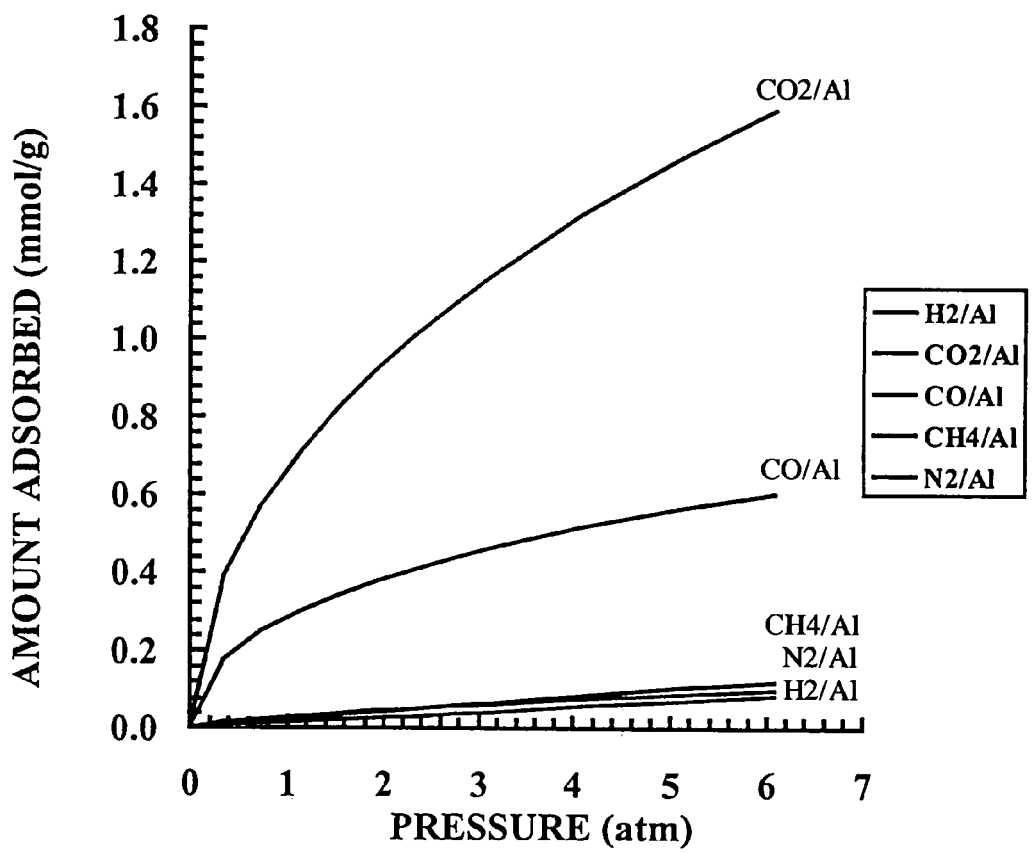
FIG. 3 shows adsorption isotherms of $CO_2$, $CH_4$, CO, $N_2$ and $H_2$ on alumina at 300K.
Figure 4:
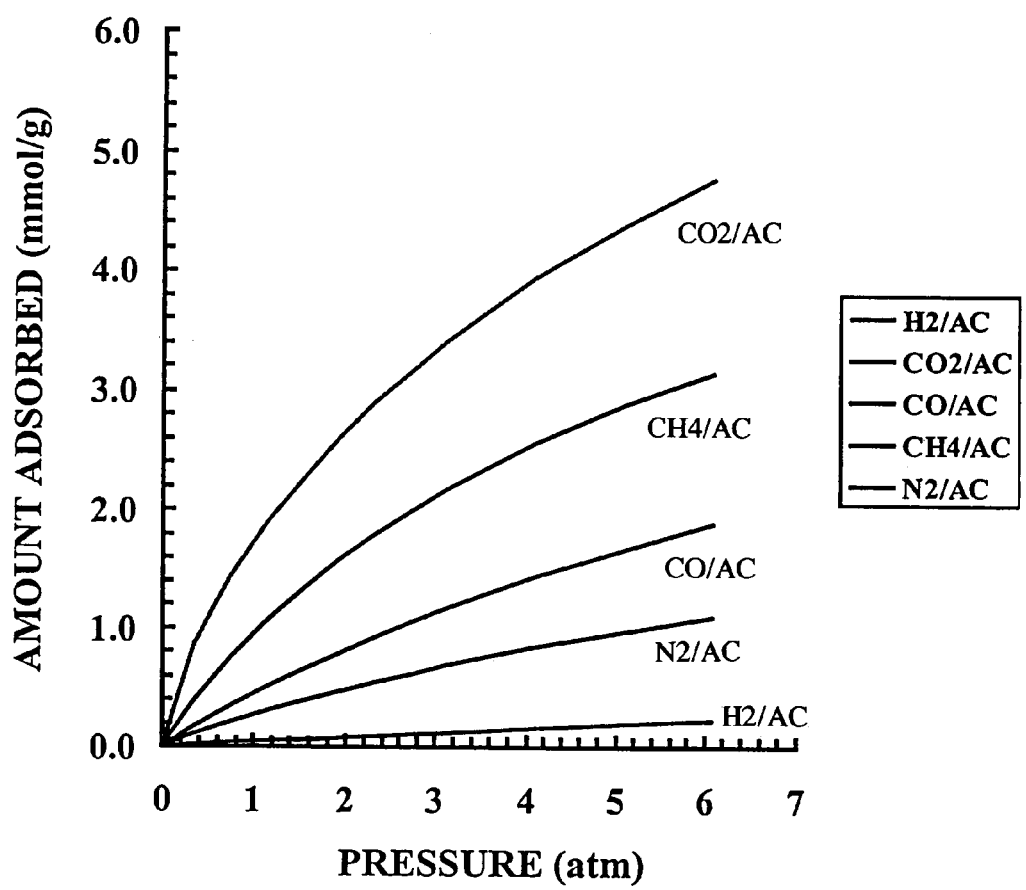
FIG. 4 shows adsorption isotherms of $Co_2$, $CH_4$, Co, $N_2$ and $H_2$ on activated carbon (AC) at 300K.
Figure 5:
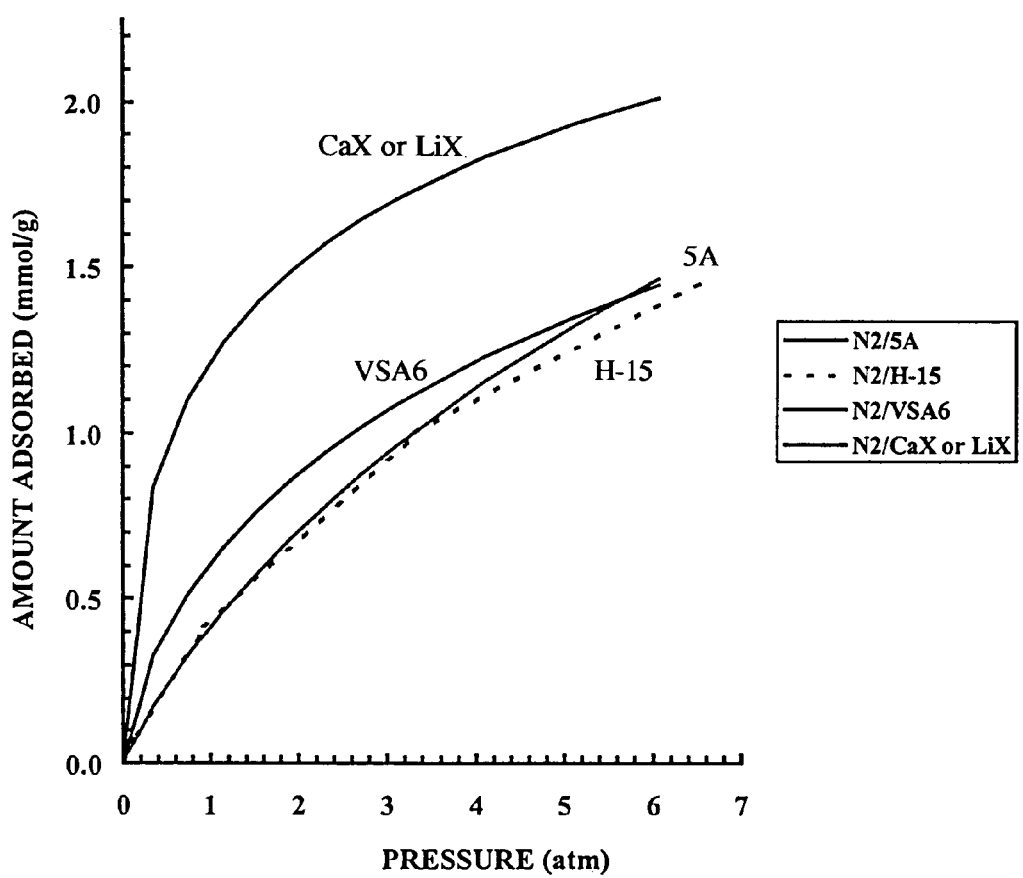
FIG. 5 shows adsorption isotherms of nitrogen on CaX, LiX, 5A, VSA6 and H-15 zeolites at 300K.
Figure 6:
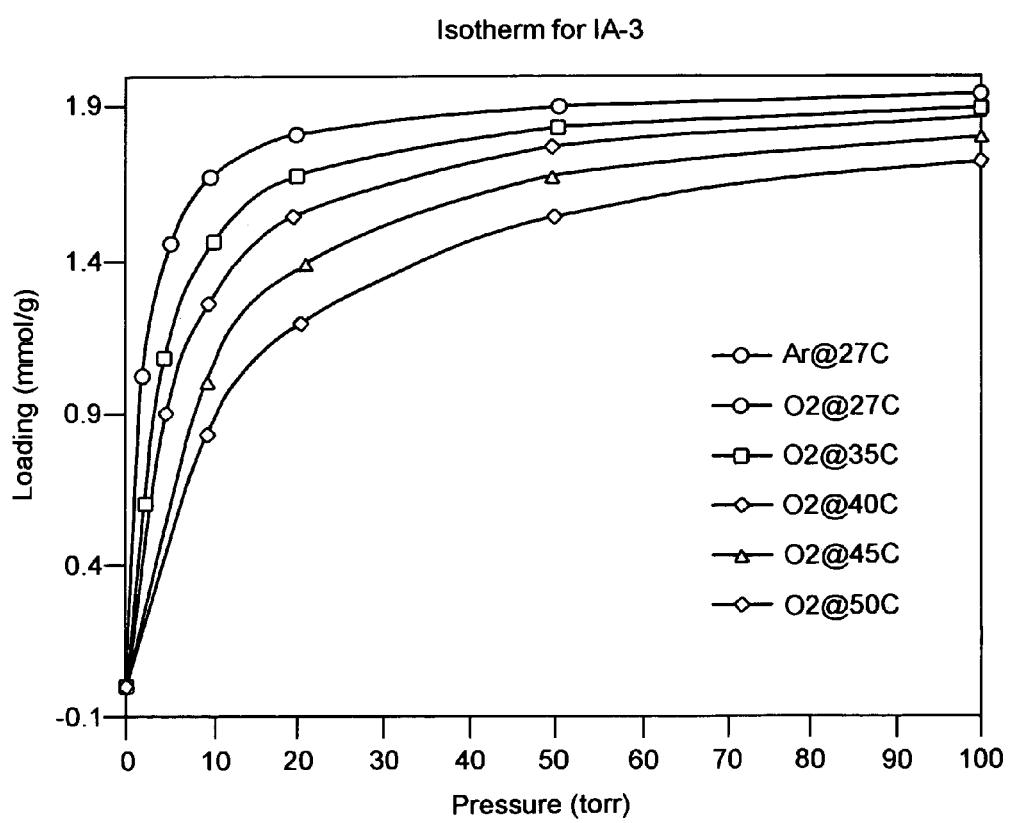
FIG. 6 shows adsorption isotherms of oxygen and argon on oxygen equilibrium selective adsorbent (IA-3) at 300K.

FIG. 1 shows one embodiment of a helium recovery system from an application 1 using helium gas. High purity helium gas (e.g. 99.999% He) for start up and make-up (for gas lost during recycle process) is provided from storage tank 9. Via lines 9a and 9b respectively it is directed via product ballast tank 8 to the application requiring purified helium.

Optional Vacuum pump 3 is used to pull gas from the application unit 1 after it is collected and cooled in an optional aftercooler 2. If the gas coming out of the application 1 is under positive pressure vacuum pump 3 is not required. The gas is compressed in recycle compressor 4, heated, then passed to the recovery system which purifies helium for recycling. The compressor 4 can be one of a number of designs. However, if streams containing particulates are involved then liquid ring compressors may be preferred. The recovery system/process includes the use of PSA system 6, with optional hydrogen removal unit 5 (if required), and optional membrane unit 7.

The optional hydrogen removal unit 5 converts hydrogen and oxygen to water over a catalyst, typically a palladium catalyst. Other catalyst materials are well known to those skilled in the art. A honeycomb monolith is used as the substrate for the palladium catalyst in the hydrogen removal unit. The catalyst chamber may be flanged slightly off center in order to facilitate removal of the monolith easily to wash off contaminants with soap and water. The hydrogen-deficient gas is then cooled and any condensed water removed via an optional separator or coalescing filter (not shown). It is then compressed to a desired pressure and sent to the PSA system 6 for removal of contaminants such as $H_2O$, $CO_2$, $N_2$, $O_2$, $CH_4$ and CO. The purified gas from the adsorption system is then stored in product ballast tank 8 and recycled to the helium application unit(s) 1.

Waste gas containing helium and impurities flows out of the PSA unit 6 during the regeneration step and, if desired, is passed through a membrane unit 7 where helium is selectively permeated to produce a helium enriched gas stream which is directed to the suction side of the recycle compressor 4. Helium depleted raffinate from the membrane is discarded via conduit 12. An optional bypass loop may be engaged which bypasses the application 1. In this case flow to the application would be terminated and redirected to conduit 13 such that PSA product gas is recycled directly to ensure proper operation of the recycle system. In the event the PSA waste gas is not passed through the membrane, this gas may be recirculated through the PSA via compressor 4. Waste gas may also simply be vented via conduit 11 (at the cost of reduced product recovery)

Upstream of the optional membrane unit 7 an optional surge tank 10 may be used to smooth out oscillations of the PSA waste gas to the membrane unit. A portion of the helium containing waste gas entering the surge tank (upstream of the membrane) may be vented via conduit 11 to balance the amount of impurities in the total system with the impurities coming from the furnace.

Since the waste gas from the PSA system 6 goes through the surge tank 10, then the membrane 7, then back to the suction side of the compressor 4, the PSA will concentrate the impurities from 10 to 10,000 times greater than what they were when they came out of the application 1. (e.g. if the application reduces the purity of He gas from 99.999 mole % down to 99.0 mole %, the PSA can purify the contaminated gas to produce product gas of 99.999 mole % He). Thus, the amount of helium discarded in the inventive process is relatively small, and high helium recovery (e.g. greater than 90%, preferably greater than 95%)_ is achieved.

The PSA system 6 uses a pressure swing adsorption process to purify the contaminated helium feed gas to produce a high purity product. The impurities are adsorbed from the feed gas at the feed gas pressure and then desorbed at a lower pressure.

The preferred adsorption process uses four adsorber beds (A-D) and provides a continuous product flow. The process operates on a repeated cycle having two basic steps comprising adsorption and regeneration. During a preferred cycle, one vessel is always adsorbing while the others are in various stages of regeneration. During the adsorption step, impurities are adsorbed by the adsorbent, thus producing a high-purity product. During the regeneration step, the impurities are cleaned from the adsorbent so that the cycle (adsorption/regeneration) can be repeated.

The exhaust/waste gas from the PSA 6, obtained during the regeneration of the PSA beds, may be sent to the membrane unit 7 for bulk impurities removal and to improve recovery as described above. Thus the feed to the recycle system consists of the used helium gas from the application unit and the enriched helium membrane recycle gas, and/or in some cases (where no membrane is used) waste gas from the PSA.

While a four bed PSA process containing four layers of adsorbents is preferred, more or less than four beds and more or less than four adsorbents could easily be used without deviating from the scope of this invention.

Figure 7:
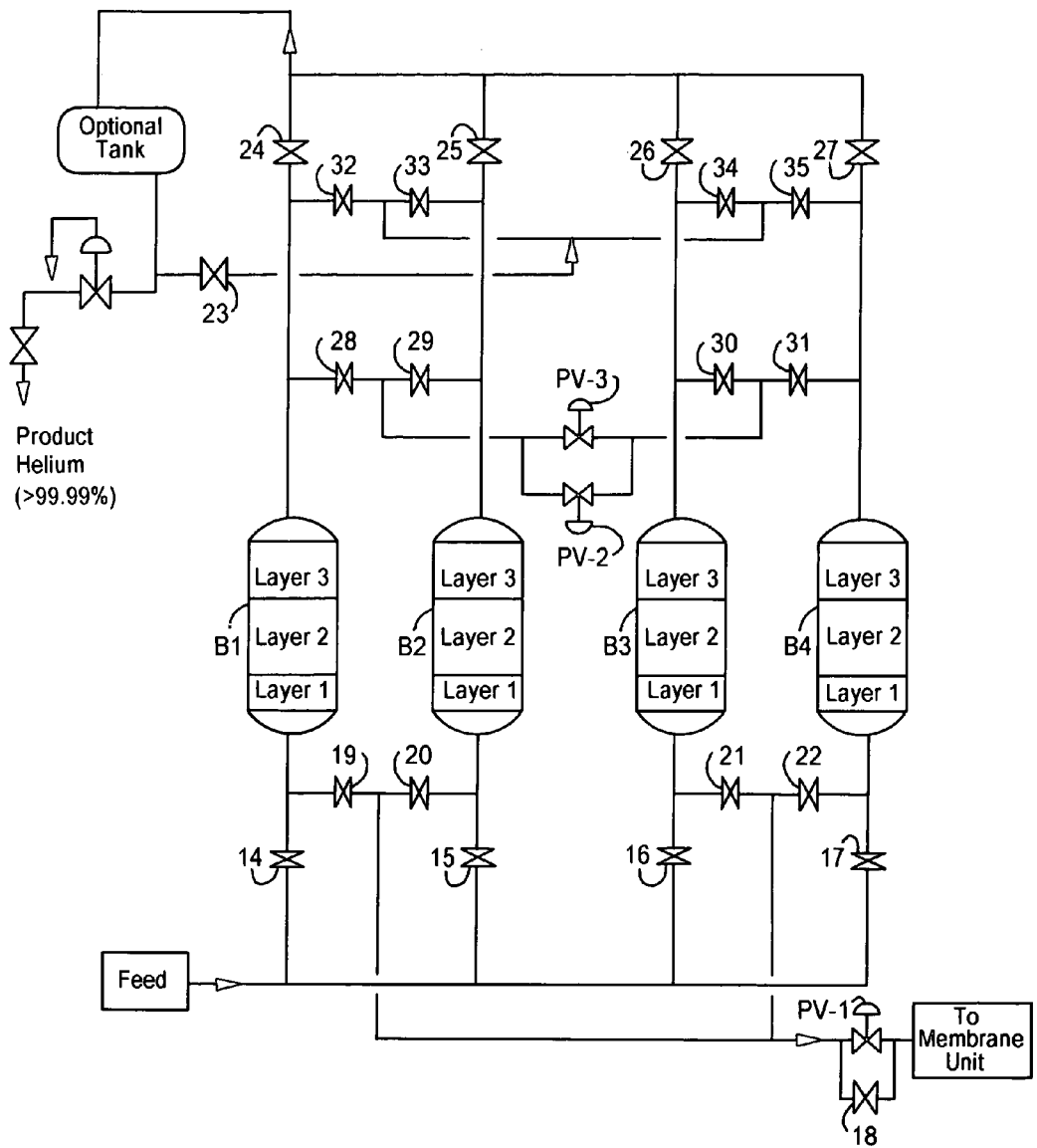
FIG. 7 is a process flow diagram for a PSA system suitable for use in the invention.

FIG. 7 shows an arrangement of three layers in an adsorbent bed of the PSA process. The feed end is at the bottom of the bed. A fourth layer, not shown, is optional, but most preferred for the invention as required for additional contaminant(s) removal. For the purpose of this disclosure, the uppermost layer is that which is closest to the discharge end of the adsorber bed. In the preferred mode of operation, four adsorbents, placed in four layers, are used in the PSA process.

Layer 1 is an adsorbent for removing water and carbon dioxide. A preferred adsorbent is alumina, though other adsorbents with preferential selection for water and/or carbon dioxide may be used. The amount of this adsorbent is typically less than 5% of the total bed volume, though this would depend upon the amount of water and/or carbon dioxide in the feed, as well as the operating conditions (e.g. pressures) of the adsorber. The determination of the appropriate amount is well within the skill of the skilled artisan.

Layer 2 is used for removing CO, $CH_4$, residual $CO_2$, and some or all of the nitrogen. Activated carbon having a bulk density of 25-45 lb/ft³ is preferred for this layer, though other adsorbents with preferential selection for CO, $CH_4$, residual $CO_2$, and some or all of the nitrogen may be used. The amount of this adsorbent is typically on the order of 40-70% of the total bed volume, though this would depend upon the amount of CO, $CH_4$, residual $CO_2$, and nitrogen in the feed, as well as the operating conditions (e.g. pressures) of the adsorber. The determination of the appropriate amount is well within the skill of the skilled artisan.

Layer 3 is utilized to remove residual $N_2$ and some or all of the $O_2$ in the feed gas. Adsorbents for this layer are preferably VSA6 or highly exchanged (>90%)CaX zeolites having a silica to alumia ratio of 2.0 to2.5. Other zeolites such as LiX, H15 and 5A zeolite may also be used. The amount of this adsorbent is typically on the order of 10-40% of the total bed volume, though this would depend upon the amount of nitrogen and oxygen in the feed, as well as the operating conditions (e.g. pressures) of the adsorber. The determination of the appropriate amount is well within the skill of the skilled artisan.

Optional layer 4 (not shown, but which is located above layer 3)is an oxygen equilibrium selective adsorbent Co{(Me2Ac2H2maldmen} (4-PyOLi) (referred to herein as "IA-3")) which is used for the removal or residual oxygen in the stream. The amount of this adsorbent is typically on the order of 5% of the total bed volume, though this would depend upon the amount of oxygen in the feed, as well as the operating conditions (e.g. pressures) of the adsorber. The determination of the appropriate amount is well within the skill of the skilled artisan.

The adsorption isotherms for the impurities above on the four adsorbents are shown in FIGS. 2-6.

The oxygen selective adsorbents (IA-3) correspond to cobalt (II) coordination complexes comprising a cobalt (II) center and five Lewis base donors that form chemical bonds with the cobalt (II) center. IA-3 is a two component system with four Lewis base donors provided by a single molecular entity (chelating ligand), and the fifth Lewis base donor provided by a second entity. The two components are selected to organize the structure and ensure that accessible binding sites exists for reversible sorption of oxygen.

Other oxygen selective adsorbents (e.g., IC2) could be used instead of IA-3 in each adsorber of the PSA process. The compound designated as IC2, abbreviated as Co {3,5-diBu$^r$sal/(EtO) ($CO_2$Et)Hmal-DAP} is the cobalt (II) complex of the dianion of a chelating ligand prepared formally by the 1:1 condensation of ethoxy-methylene diethylmalonate and 3,4-diamino pyridine, followed by schiff base condensation of the 3,5-di-tert-butysalicylaldehyde. Other preferred TEC's include Co{($Me_2Ac_2H_2$malen} (4-PyOLi) and Co{$Me_2Ac_2H_2$maltmen} (4-PyOLi). These TECs, together with IA-3 are described in commonly assigned U.S. Pat. No. 6,183,709 and in co-pending commonly assigned U.S. application Ser. No. 09/456,066 (Zhang et al) and Ser. No. 09/725,845 (Zhang et al).

Any activated carbon having bulk density in the range of 25-45 lb/ft$^3$ could also be used in the PSA process of this invention. Furthermore, various ion-exchanged zeolites could be utilized in the PSA process of this invention. Examples include zeolites having silica to alumina ratio in the range of 2.0 to 2.5 and with high (e.g. >80%, preferably >90%) cation exchange content. Such zeolites include highly exchanged CaX, Na-Y, Zn-X, Li-X, 13x, and 5A zeolites with silica to alumina ratios of 2.0-2.5.

Also, the zeolite layer/zone of each bed could be replaced with multiple layers of different adsorbents. For example, the zeolite layer could be substituted by a composite adsorbent layer containing different adsorbent materials positioned in separate zones in which temperature conditions favor adsorption performance of the particular adsorbent material under applicable processing conditions in each zone. Further details on composite adsorbent layer design is given by Notaro et al., U.S. Pat. No. 5,674,311.

Table 1 shows the PSA feed gas composition when the helium application unit is a metal atomization unit and a membrane unit is used downstream of the PSA to recycle PSA waste gas back to the PSA process.

TABLE 1

Typical PSA Feed and Product Gas Specifications Using a Helium recovery process with a metal atomization application.

| Impurity | Feed Gas Specification | Product Gas Specification |
| --- | --- | --- |
| N2 | 2.5 mole % | <5 ppmv |
| O2 | 1.0 mole % | <10 ppmv |
| H2O | 0.2 mole % | <50 ppmv |
| CO2 | 0.203 mole % | <5 ppmv |
| Helium | 96.04 mole % | >99.999 mole % |

The inventive helium recovery system using a PSA having at least three layers of adsorbents in each adsorber as described above, processes more feed gas per unit weight of adsorbent at a given P/F ratio (purge to feed) than other prior art PSA systems. This is because other prior art systems used multiple PSA units or more adsorbent beds in the PSA (see e.g. Stoner et al and D'Amico et al cited above). The inventive system offers superior performance to the prior art as the adsorbents used have higher differential loadings than the adsorbents (typically 5A) used in prior art systems.

This is illustrated in FIGS. 2-6 which compare isotherms for adsorbents used in the present invention with isotherms for prior art materials.

Given this efficiency, the amount of adsorbent required (e.g. the bed size factor) is reduced by a factor of 25-50% as compared to prior art processes. This reduction in bed size factor results in smaller void volumes. Consequently, less helium is lost during the regeneration of the bed, and higher helium recovery is achieved.

The preferred use of an additional layer of VSA6 or CaX zeolite adsorbent upstream of an oxygen selective layer results in further enhanced helium recovery relative to activated carbon used in the aforementioned prior art helium recovery processes. This is because the higher $N_2$ working capacitiy of VSA6 or CaX zeolite in the upstream layer, and $O_2$ working capacity in the downstream layer of each bed give IA-3 and VSA6 or CaX adsorbents superior performance over the carbon based adsorbent used in prior art PSA processes using activated carbon and 5A (H-15) for helium recovery.

The increased recovery of the PSA process results in a decrease in the amount of PSA waste gas that is recycled to the membrane and ultimately back to the PSA feed. In addition, because of the reduction in the quantity of the recycle gas, the power consumption and operating cost of the recycle compressor are reduced significantly in the inventive helium recovery process.

The invention will be further described with reference to the four bed PSA process shown in FIG. 7. The membrane unit used in the helium recovery process is documented extensively in the aforementioned prior art (see e.g. U.S. Pat. No. 5,632,803).

FIG. 7 shows four adsorbent beds (B1, B2, B3 and B4) and associated valves and conduits that will be used to illustrate the enhanced PSA process performance of this invention. Referring to FIG. 7, the PSA process used in the helium recovery unit is disclosed over one complete PSA cycle, and the PSA valve switching and steps are given in Tables 2 and 3, respectively. PV valves are positional valves that control gas flow in the conduits in a manner well known in the art.

Step 1 (AD1): Bed 1 (B1) is in the first adsorption step (AD1), while Bed 2 (B2) is undergoing countercurrent blowdown (BD), Bed 3 (B3) is undergoing Lie first equalization falling step (EQ1DN), and bed 4 (B4) is undergoing the second pressure equalization rising step (EQ2UP).

Step 2 (AD2): Bed 1 is in the second adsorption step (AD2) and is also supplying product gas to bed 4 that is undergoing the first product pressurization (PP1) step. During the same time, beds 2, 3 and 4 are undergoing purge, cocurrent depressurization and first product pressurization, respectively.

Step 3 (AD3): Bed 1 is in the third adsorption step (AD3), and is also supplying product gas to Bed 4 that is undergoing the second product pressurization (PP2) step. During the same time period, beds 2, 3, and 4 are undergoing the first equalization rising step (EQ1UP), second equalization falling (EQ2DN), and second product pressurization step (PP2), respectively.

Step 4 (EQ1DN): Bed 1 is undergoing the first equalization falling step (EQ1DN), while bed 2 receives the gas from bed 1 and is undergoing the second equalization rising step (EQ2UP). Beds 3 and 4 are now undergoing blowdown (BD) and the first adsorption step (PP1), respectively.

Step 5 (PPG): Bed 1 is undergoing cocurrent depressurization step to provide purge gas (PPG) to bed 3, while Beds 2 and 4 are undergoing first product pressurization (PP1) and the second adsorption step (AD2), respectively.

Step 6 (EQ2DN): Bed 1 undergoes a second equalization falling step (EQ2DN) by sending low pressure equalization gas to bed 3 that is undergoing the first equalization rising (EQ1UP) step. Beds 2 and 4 are undergoing the second product pressurization (PP2) and third adsorption step, respectively.

Step 7 (BD): Beds 1 and 3 undergo the countercurrent blowdown (BD) and first adsorption (AD1) step, respectively. During this time Beds 3 and 4 are undergoing bed-to-bed equalization, i.e., Beds 3 and 4 are undergoing the second equalization rising (EQ2UP) and first equalization falling (EQ1DN) steps, respectively.

Step 8 (PG): Bed 1 is now receiving purge gas (PG) from Bed 4, and Beds 2 and 3 are undergoing the second adsorption step and first product pressurization (PP1) step, respectively.

Step 9 (EQ1UP): Bed 1 is undergoing the first equalization rising step (EQ1UP) by receiving low pressure equalization gas from bed 4 that is undergoing the second equalization falling step (EQ2DN). During the same time, Beds 2 and 3 are undergoing the third adsorption step (AD3) and the second product pressurization (PP2), respectively.

Step 10 (EQ2UP): Bed 1 is undergoing the second equalization rising step (EQ2UP) by receiving high pressure equalization gas from bed 2 that is undergoing the first equalization falling step (EQ1DN). During the same time, Beds 3 and 4 are undergoing the first adsorption (AD1) step and countercurrent blowdown step, respectively.

Step 11 (PP1) Bed 1 is receiving first product pressurization (PP1) gas from bed 3 that is also in the second adsorption step (AD2), while Bed 2 is undergoing cocurrent depressurization step to provide purge gas (PPG) to bed 4.

Step 12 (PP2) Bed 1 is receiving second product pressurization (PP2) gas from bed 3 that is also in the third adsorption step (AD3). During the same time, Bed 2 undergoes a second equalization falling step (EQ2DN) by sending low pressure equalization gas to bed 4 that is undergoing the first equalization rising (EQ1UP) step.

Figure 8:
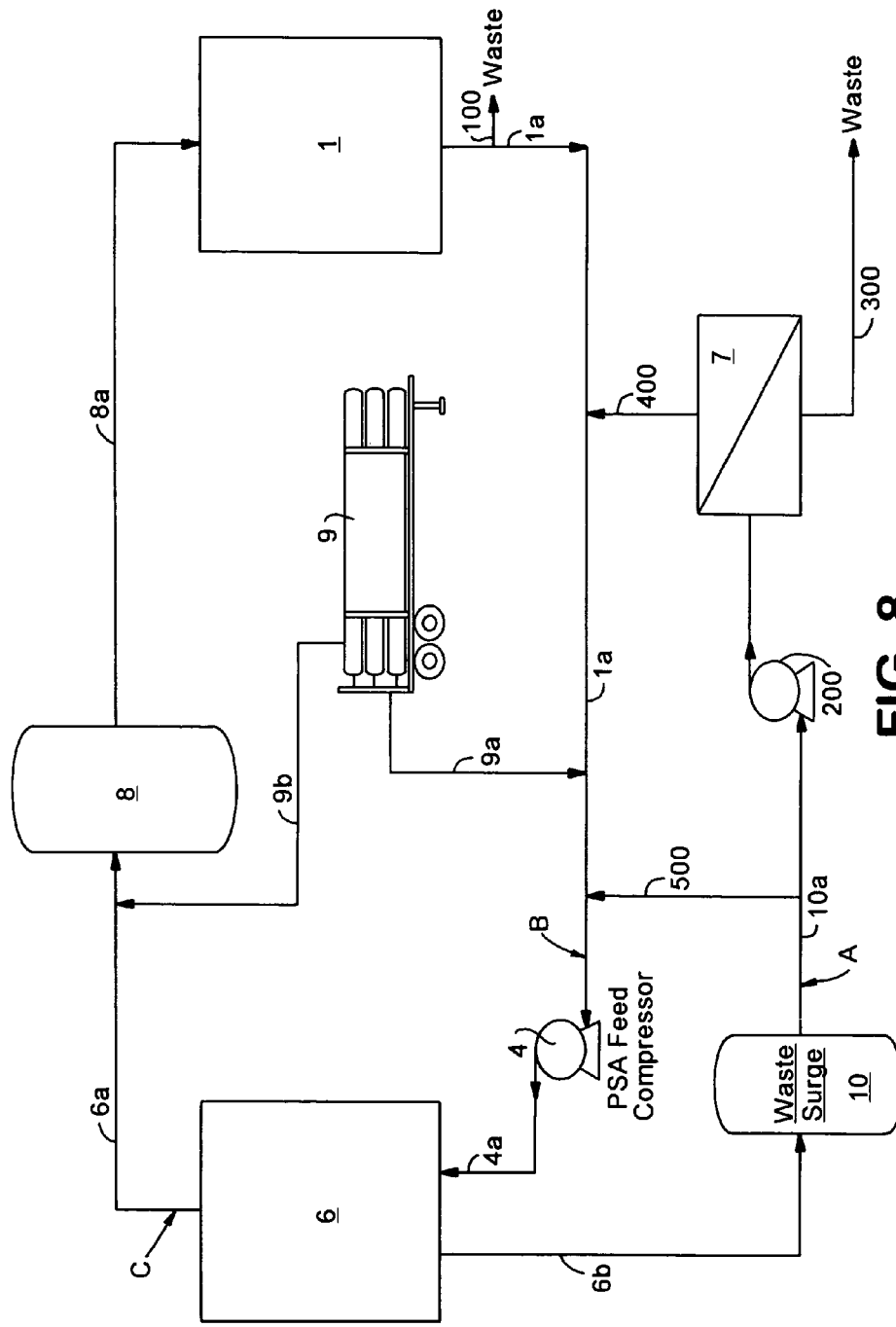
FIG. 8 is a process flow diagram in accordance with an alternative embodiment of the invention.

The valve switching logic for the four bed PSA process of FIG. 8 is shown in Table 2, and the duration of each step in the PSA cycle as shown in Table 3. However, it should be noted that the twelve step PSA cycle is used only to illustrate the enhanced PSA process performance achieved by replacing conventional carbon based adsorbents used in prior with a layered arrangement of adsorbents to remove several kinds of impurities. Further, the upper layers (Layers 3 & 4) are used primarily for the removal of trace level of impurities, whereas, the upstream layers (alumina and activated carbons) are used for bulk impurity removal. In addition, other PSA cycles may also be used to show the enhanced PSA process performance without deviating from the scope of this invention Note from Tables 2 and 3 that the four beds operate in parallel, and during ¼ of the total cycle time one of the beds is in the adsorption step, while the other beds are either undergoing pressure equalization, purge, blowdown, or product pressurization.

TABLE 2

Four Bed H2 PSA Valve Switching
(O = OPENED, C = CLOSED)

| | Step | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bed 1 (BD1) | AD1 | AD2 | AD3 | EQ1 DN | PPG | EQ2 DN | BD | PG | EQ1 UP | EQ2 UP | PP1 | PP2 |
| Bed 2 (BD2) | BD | PG | EQ1 UP | EQ2 UP | PP1 | PP2 | AD1 | AD2 | AD3 | EQ1 DN | PPG | EQ2 DN |
| Bed 3 (BD3) | EQ1 DN | PPG | EQ2 DN | BD | PG | EQ1 UP | EQ2 UP | PP1 | PP2 | AD1 | AD2 | AD3 |
| Bed 4 (BD4) | EQ2 UP | PP1 | PP2 | AD1 | AD2 | AD3 | EQ1 DN | PPG | EQ2 DN | BD | PG | EQ1 UP |
| Valve No. | | | | | | | | | | | | |
| 14 | O | O | O | C | C | C | C | C | C | C | C | C |
| 15 | C | C | C | C | C | C | O | O | O | C | C | C |
| 16 | C | C | C | C | C | C | C | C | C | O | O | O |
| 17 | C | C | C | O | O | O | C | C | C | C | C | C |

TABLE 2-continued

Four Bed H2 PSA Valve Switching
(O = OPENED, C = CLOSED)

| | Step | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 18 | O | O | C | O | O | C | O | O | C | O | O | C |
| 19 | C | C | C | C | C | C | O | O | C | C | C | C |
| 20 | O | O | C | C | C | C | C | C | C | C | C | C |
| 21 | C | C | C | O | O | C | C | C | C | C | C | C |
| 22 | C | C | C | C | C | C | C | C | C | O | O | C |
| 23 | C | O | O | C | O | O | C | O | O | C | O | O |
| 24 | O | O | O | C | C | C | C | C | C | C | C | C |
| 25 | C | C | C | C | C | C | O | O | O | C | C | C |
| 26 | C | C | C | C | C | C | C | C | C | O | O | O |
| 27 | C | C | C | O | O | O | C | C | C | C | C | C |
| 28 | C | C | C | C | O | O | C | O | O | C | C | C |
| 29 | C | O | O | C | C | C | C | C | C | C | O | O |
| 30 | C | O | O | O | O | O | C | C | C | C | C | C |
| 31 | C | C | C | C | C | C | C | O | O | C | O | O |
| 32 | C | C | C | O | C | C | C | C | C | O | O | O |
| 33 | C | C | C | O | O | O | C | C | C | O | C | C |
| 34 | O | C | C | C | C | C | O | O | O | C | C | C |
| 35 | O | O | O | C | C | C | O | C | C | C | C | C |

TABLE 3

Time Interval and Step Sequence of the PSA Cycle

| Step Number | Time Interval | BED #1 | BED #2 | BED #3 | BED #4 |
|---|---|---|---|---|---|
| 1 | 0–12 | AD1 | BD | EQ1DN | EQ2UP |
| 2 | 12–30 | AD2/PP1 | PG | PPG | PP1 |
| 3 | 30–42 | AD3/PP2 | EQ1UP | EQ2DN | PP2 |
| 4 | 42–54 | EQ1DN | EQ2UP | BD | AD1 |
| 5 | 54–72 | PPG | PP1 | PG | AD2/PP1 |
| 6 | 72–84 | EQ2DN | PP2 | EQ1UP | AD3/PP2 |
| 7 | 84–96 | BD | AD1 | EQ2UP | EQ1DN |
| 8 | 96–114 | PG | AD2/PP1 | PP1 | PPG |
| 9 | 114–126 | EQ1UP | AD3/PP2 | PP2 | EQ2DN |
| 10 | 126–138 | EQ2UP | EQ1DN | AD1 | BD |
| 11 | 138–156 | PP1 | PPG | AD2/PP1 | PG |
| 12 | 156–168 | PP2 | EQ2DN | AD3/PP2 | EQ1UP |

AD1 = First Adsorption Step
AD2/PP1 = Second Adsorption Step/First product pressurization
AD3/PP2 = Third Adsorption Step/Second product pressurization
EQ1DN = First Equalization Down
PPG = Provide Purge Gas
EQ2DN = Second Equalization Down
BD = Blowdown
PG = Purge
EQ1UP = First Equalization Up
EQ2UP = Second Equalization Up
PP1 = First Product Pressurization
PP2 = Second Product Pressurization The data presented below illustrates the benefits of the inventive system/process. We note that while both examples are within the scope of the invention, the example in Table 4 illustrates a more preferred embodiment.

Table 4 gives an example of the operating conditions and the PSA process performance using four layers of adsorbents (as described above with reference to FIG. 7) (alumina, activated carbon, zeolite, and IA-3) in each adsorber and following the four bed PSA process described above with reference to FIG. 7. In this non-limiting example, the first layer is alumina, the second layer is activated carbon, the third layer is VSA6 zeolite, and the fourth layer is IA-3.

Table 5 shows an alternate embodiment of the invention case using three layers of adsorbents (alumina, activated carbon, and zeolite) and the same PSA process operating conditions as used for the Example in Table 4. In comparing Tables 4 & 5, a significant reduction in total bed size factor and higher helium recovery for the case using IA-3 (Table 4) are realized relative to the case not using IA-3 (Table 5).

In the tables, the symbols have the following meaning: TPD=ton (2000 lb) per day of helium, kPa=1000 Pa=S. I. unit for pressure (1.0 atm. =101.323 kPa), s=time unit in seconds. Also, in the tables, the nitrogen equilibrium selective adsorbent is VSA6, and the oxygen equilibrium selective adsorbent such as IA3. The results shown in the tables correspond to the cases where PSA waste gas, obtained during the regeneration steps of the PSA cycle, is fed to a membrane unit as described above. The permeate from the membrane unit is recycle back to the PSA feed. Thus, the PSA feed is a combination of the exhaust gas leaving the helium using application and the recycle gas from the membrane unit. Also, a hydrogen removal unit was placed at the upstream end of the PSA process.

TABLE 4

The results shown below were obtained from PSA simulation results using a feed mixture of: 96.037% He, 0.263% $CO_2$, 0.20% $H_2O$, 1.0% $O_2$ and 2.5% $N_2$. Also, in the table, total bed size factor is the total quantity of adsorbents per ton per day of He produced.

| | |
|---|---|
| Cycle time (s) | 168 |
| Adsorbent in first layer of Bed | Alumina |
| Amount of alumina (lb/TPD He): | $3.2437 \times 10^2$ |
| Adsorbent in second layer of bed: | activated carbon |
| Amount of activated carbon (lb/TPD He): | $6.3568 \times 10^2$ |
| Adsorbent in third layer of bed: | VSA 6 |
| Amount of VSA6 zeolite (lb/TPD He): | $8.727 \times 10^2$ |
| Adsorbent in fourth layer of bed: | IA-3 |
| Amount of IA-3 (lb/TPD He): | $1.164 \times 10^2$ |
| High Pressure: | $1.312 \times 10^3$ kPa |
| Low Pressure: | $1.05 \times 10^2$ kPa |
| Feed Flux: | $2.9027 \times 10^{-2}$ kmol/s · m$^2$ |
| Hydrogen Purity: | >99.999% |
| PSA Per Pass Helium Recovery: | 72% |
| PSA/membrane Helium Recovery: | >98% |
| Total Bed Size Factor (lb/TPD He): | $1.9492 \times 10^3$ |
| Temperature: | 316° K. |

TABLE 5

The results shown below were obtained from PSA simulation results using a feed mixture of: 96.037% He, 0.263% $CO_2$, 0.20% $H_2O$, 1.0% $O_2$ and 2.5% $N_2$. Also, in the table, total bed size factor is the total quantity of adsorbents per ton per day of He produced.

| | |
|---|---|
| Cycle time (s) | 168 |
| Adsorbent in first layer of Bed | Alumina |
| Amount of alumina (lb/TPD He): | $3.2437 \times 10^2$ |
| Adsorbent in second layer of bed: | activated carbon |
| Amount of activated carbon (lb/TPD He): | $6.3568 \times 10^2$ |
| Adsorbent in third layer of bed: | VSA 6 |
| Amount of VSA6 zeolite (lb/TPD He): | $1.3963 \times 10^3$ |
| Adsorbent in fourth layer of bed: | None |
| Amount of IA-3 (lb/TPD He): | 0.0 |
| High Pressure: | $1.312 \times 10^3$ kPa |
| Low Pressure: | $1.05 \times 10^2$ kPa |
| Feed Flux: | $2.9027 \times 10^{-2}$ kmol/s · m² |
| Hydrogen Purity: | >99.999% |
| PSA Per Pass Helium Recovery: | 60% |
| PSA/membrane Helium Recovery: | >95% |
| Total Bed Size Factor (lb/TPD He): | $2.3564 \times 10^3$ |
| Temperature: | 316° K. |

An alternative embodiment will be described with reference to FIG. 8.

Helium gas (typically having a purity of 99.999 mole %) is supplied to an Application 1 from a product ballast tank 8 via conduit 8a. At start-up, gas is supplied to ballast tank 8 via conduit 9b from source 9. The Application will introduce varying amounts of stream impurities into the helium. This contaminated helium (e.g. having a purity of 99%) is removed from the Application as a "used" gas stream. The used gas is directed through an optional hydrogen removal system, if necessary (this hydrogen removal system is illustrated in FIG. 1). The gas is then-collected by the PSA feed compressor 4 and recycled to the recovery system (including at least PSA 6) via conduit 4a for clean-up before being forwarded to the product ballast tank 8 for re-use. Some of the used gas reclaimed from the Application is too rich in impurities for the recycle system to handle, it must therefor be vented as waste via conduit 100 rather than recycled. The gas lost in this venting step is replaced with helium from a source 9 via conduit 9a. Periodically the PSA adsorbent beds will need to be regenerated. This regeneration process creates a helium-rich waste stream.

To effect greater recovery, the PSA waste stream is recycled via conduit 6b and optional surge tank 10, directly back to the PSA feed compressor 4 via line 500 when the impurity level is low. Recycling the PSA waste gas causes the impurity concentrations in this recycle stream to accumulate over successive cycles. At some point these impurities will reach a concentration that will exceed the capacity of the PSA adsorber vessels.

An analyzer monitors the waste stream for this upper limit at position A in FIG. 8. When this upper setpoint is reached the majority of the PSA waste gas stream is redirected via line 10a to compressor 200, then to the membrane 7. The membrane quickly rejects PSA waste stream impurities via line 300, enriching the recycled waste stream 400 in helium. When the analyzer at position A indicates that the lower impurity setpoint has been reached membrane compressor capacity is reduced and the majority of the PSA waste gas stream is again directed via line 500 and other conduits to the suction side of the PSA feed compressor 4.

The system keeps pace with the Application demand by monitoring the PSA feed compressor suction pressure at position B. High Application usage rates lead to higher amounts of used helium at the PSA compressor inlet. This results in a higher inlet pressure. The higher inlet pressure will cause the compressor to increase capacity in an effort to reduce the inlet pressure. This generates additional helium for the Application. Falling suction pressure serves to decrease the compressor capacity, thus having the opposite effect on available helium product. If increasing the compressor throughput does not provide sufficient helium to maintain the ballast tank delivery pressure setpoint, the system will automatically add make-up gas (from source 9) to the PSA feed compressor inlet via line 9a. The addition of gas will serve to increase the inlet pressure further, thus causing the compressor to increase its capacity further, making additional product available to the ballast tank. System integrity is ensured by monitoring the product purity through an analyzer located at position C in FIG. 8.

The inventive recovery system is capable of processing contaminated helium gas streams from one or more applications. For example, one recovery process can operate with one or more furnaces.

Figure 9:
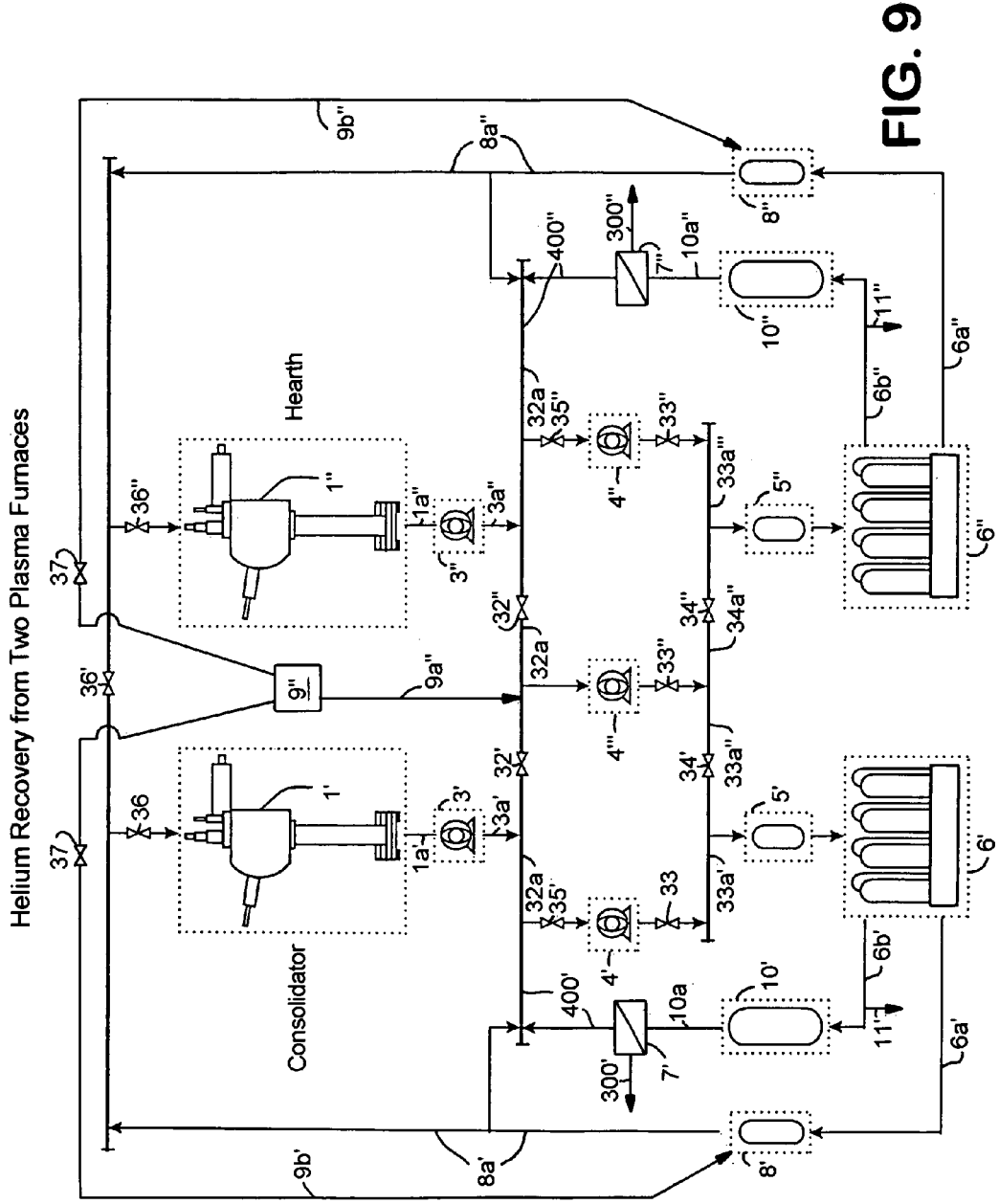
FIG. 9 is a process flow diagram in accordance with an embodiment of the invention showing two applications in combination with two recovery systems.

However, for maximum reliability the recovery system can have an independent recovery system for each application with cross ties between the systems as shown in FIG. 9. The membrane unit(s) 7' and 7" may not be necessary when the PSA per pass recovery is high (>90%). However, whenever the recovery from the PSA process is considered too low (e.g., less than 90%), then the use of a membrane unit is preferred to conserve more than 90% of the gase (e.g., helium).

The helium recovery system shown in FIG. 9 has the flexibility of using one PSA system for each application with cross ties to allow any application to use any PSA. Note that because the reference numbers refer to similar components as in FIGS. 1 and 8, they are identified as 1' and 1" (e.g. for the application).

The recovery processes for each application/recovery system operate in essentially the same manner as in FIGS. 1 and/or 8, with the difference being that a specific application (1' or 1") is not required to operate in conjunction with a specific recovery system (e.g. specific PSA and/or specific membrane).

The applications 1' and 1" can operate either under positive or subambient pressure. The off-gas from each application 1, 1" would pass via conduits 1a' and 1a" through a vacuum pump 3', 3" (if under subambient pressure) via conduits 3a' and 3a", and one or more of control valves 32', 32'" via one or more conduits 32a to the suction side of a compressor 4', 4" and/or 4'". The compressor would have a by-pass loop such that as the number of applications decreased the by-pass valves (e.g. (e.g. 32', 32", 33', 33", 33'", 34', 34" and 35', 35")for the compressor would open to maintain a constant compressor discharge.

Thus if only application 1' were used and only compressor 4' were used, valves 32' and 32" would be closed and 35' would be opened. Further, depending upon which PSA unit (6' or 6") were to be used, one or more of valves 34' or 34" would be opened to allow for gas flow through conduits 33a', 33a", 34a" or 33a'" depending upon the desired recycling process loop.

The gas is passed from the recycle compressor(s) (4', 4", 4'") to one or more of the optional hydrogen removal systems 5' and 5", if necessary, and one or more of the the PSA purifiers 6' and 6" as described above. Purified helium gas is returned via conduits 6a' and/or 6a", ballast tanks 8' and/or 8" and conduits 8a' and/or 8a" to the applications 1' and/or 1". Waste gas is partially vented via conduits 11' and 11" (if applicable), with the balance passing via lines 6b' and/or 6b" through optional surge tanks 10' and 10" to optional membrane units 7' and 7" if applicable. Helium depleted raffinate is removed from the membrane via conduits 300' and/or 300". Helium enriched gas from the membrane is recycled via lines 400' and/or 400" through one or more of compressors 4', 4" and/or 4'" back to the adsorption unit (6', 6").

We note that supply 9" may be used as a source of the original feed gas for the application (via lines 9b' and/or 9b" and opened valve 37) in the same manner as in FIGS. 1 and/or 8; and or as make-up gas to replace gas lost in the process (e.g. through venting) via lines 9a" in a similar manner as in FIGS. 1 and/or 8.

Although the above PSA process is discussed in relation to helium recovery, the aforementioned key features could also be extended to other separation processes, e.g. noble gas recovery, H2 and $CO_2$ production from synthesis gas or other sources containing H2 and $CO_2$ in the feed, or in other PSA processes for co-production of $H_2$ and CO.

The novel helium recovery process is capable of removing air contaminants, hydrogen and particulate from various applications. The recovery system is unique because hydrogen in the recycle stream is kept to a minimum by operating the catalyst bed in the hydrogen removal unit with excess oxygen.

Additional unit operations may hp included in the recovery unit were it is necessary to remove other contaminants, e.g., metals, and metal salts from spent/used helium exiting from some applications, e.g., an atomization furnace that produce powders. Such operations (e.g. the use of bag housings or filters) are well known to those skilled in the art.

Also, in prior art hybrid processes (e.g., PSA & membrane), recycling of the waste gas stream from the PSA to the membrane occurs intermittently based on the composition of the waste gas obtained during the regeneration of the PSA beds.

However in the present invention (with reference to FIGS. 1 and/or 8), a fraction of the helium entering the surge tank 10 (upstream of the membrane and downstream of the PSA waste end) may be vented continuously to balance the amount of impurities in the total system with the impurities coming from the helium application. the waste gas from the PSA 6 goes through the surge tank 10, then the membrane 7, then back to The suction side of the recycle compressor 4; the PSA will concentrate the impurities from 10 to 10,000 times greater than what is coming from the application 1. Thus, the amount of helium discarded via lines 11, 12 can be relatively small, and high helium recovery (e.g. greater than 90 to 95%) is achieved.

Although the invention has been described with reference to specific embodiments as examples, it will be appreciated that it is intended to cover all modifications and equivalents.

The term "comprising" is used herein as meaning "including but not limited to", that is, as specifying the presence of stated features, integers, steps or components as referred to in the claims, but not precluding the presence or addition of one or more other features, integers, steps, components, or groups thereof.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A gas recovery system comprising a source of gas having a preselected concentration of a desired component, at least one application that adds impurities to said gas, and at least one adsorption system that purifies said gas to produce a purified gas for re-use in said application, wherein said at least one adsorption system includes at least one adsorbent bed (A) having at least three layers of adsorbents, and wherein a waste stream generated by the at least one adsorption system can be selectively recycled to the same at least one adsorption system until a predetermined upper limit of waste impurities in said waste stream is reached; and wherein said waste stream can be treated prior to recycle to said same at least one adsorption system when said waste impurities are above said predetermined upper limit such that waste impurities in said waste stream can be removed until a level below said predetermined upper limit is reached.

2. The gas recovery system of claim 1, wherein the first layer of adsorbent comprises an adsorbent selective for one or more of water and carbon dioxide, the second layer of adsorbent comprises an adsorbent selective for one or more of CO, $CH_4$, carbon dioxide and nitrogen, and the third layer of adsorbent comprises an adsorbent selective for one or more of nitrogen and oxygen.

3. The gas recovery system of claim 2, wherein said adsorbent bed further comprises a layer of an oxygen selective adsorbent.

4. The gas recovery system of any one of claims 1-3, wherein said first adsorbent layer comprises alumina, said second adsorbent layer comprises activated carbon and said third adsorbent layer comprises a zeolite.

5. The gas recovery system of claim 3, wherein said oxygen selective adsorbent is IA-3.

6. The gas recovery system of claim 4, wherein said zeolite is selected from the group consisting of VSA6, CaX zeolite having greater than 90% Ca exchange, LiX, H-15 and 5A.

7. The gas recovery system of claim 4, wherein said activated carbon has a bulk density of 25 pounds/ft$^3$ to 45 pounds/ft$^3$.

8. The gas recovery system of claim 1, wherein said system further comprises at least one membrane for purifying at least a portion of the waste stream containing the desired component that is produced from said at least one adsorption system.

9. The gas recovery system of claim 1, wherein said at least one adsorption system includes four adsorbent beds (A-D).

10. The gas recovery system of claim 1, wherein said desired component is selected from the group consisting of the noble gases.

11. The gas recovery system of claim 1, wherein said desired component is helium, and said preselected concentration is 99.999 mole %.

12. A gas recovery process comprising the steps of:
a) providing gas having a preselected concentration of a desired component to an application;
b) adding impurities to said gas in said application to produce an impure gas having a lower concentration of said desired component;
c) passing said impure gas to at least one adsorption system that purifies said gas to produce a purified gas having said preselected concentration of said desired component for re-use in said application, wherein said at least one adsorption system includes at least one adsorbent bed (A) having at least three layers of adsorbents; and
d) selectively recycling waste gas generated by the at least one adsorption system to the same at least one adsorption system until a predetermined upper limit of waste impurities in said waste stream is reached; and treating said waste stream prior to recycle to said same at least one adsorption system when said waste impurities are above said predetermined upper limit such that waste impurities in said waste stream are removed until a level below said predetermined upper limit is reached.

13. The gas recovery process of claim 12, wherein said at least one adsorption system produces said waste gas having a second concentration of said desired component which is lower than said preselected concentration, and wherein said waste gas is recirculated through said at least one adsorption system for purification, and wherein said purified recirculated gas is provided to said application.

14. The process of any one of claims 12-13, wherein said at least one adsorption system produces said waste gas containing said desired component, and wherein said waste gas is directed to a membrane system which produces a partially purified gas having a higher concentration of said desired component than said waste gas, and wherein said partially purified gas is combined with said impure gas prior which is then passed through said adsorption system for purification.

15. The process of any one of claims 12-13, wherein said desired component is helium.

16. The process of any one of claims 12-13, wherein said adsorption system (6) comprises four beds (A-D).

17. The process of any one of claims 12-13, wherein the first layer of adsorbent comprises an adsorbent selective for one or more of water and carbon dioxide, the second layer of adsorbent comprises an adsorbent selective for one or more of CO, $CH_4$, carbon dioxide and nitrogen, and the third layer of adsorbent comprises an adsorbent selective for one or more of nitrogen and oxygen.

18. The process of any one of claims 12-13, wherein said adsorbent bed further comprises an oxygen selective adsorbent.

19. The process of any one of claims 12-13, wherein said first adsorbent layer comprises alumina, said second adsorbent layer comprises activated carbon and said third adsorbent layer comprises a zeolite.

20. The process of claim 18, wherein said oxygen selective adsorbent is IA-3.

21. The process of claim 19, wherein said zeolite is selected from the group consisting of VSA6, CaX zeolite having greater than 90% Ca exchange, LiX, H-15 and 5A.

22. The process of claim 19, wherein said activated carbon has a bulk density of 25 pounds/$ft^3$ to 45 pounds/$ft^3$.

23. The gas recovery system of claim 1, wherein when said predetermined upper limit of waste impurities in said waste stream is reached, said waste stream generated by the at least one adsorption system can be vented rather than treated.

24. The gas recovery process of claim 12, wherein when said predetermined upper limit of waste impurities in said waste stream is reached, said waste stream generated by the at least one adsorption system can be vented rather than treated until a level below said predetermined upper limit is reached.

* * * * *